United States Patent [19]

Nishida et al.

[11] Patent Number: 4,611,918

[45] Date of Patent: Sep. 16, 1986

[54] METHOD OF DETERMINING THE OPTIMUM EXPOSURE CONDITIONS FOR A COLOR PRINTER

[75] Inventors: Shigeki Nishida, Kainan; Hiroo Ikeura, Wakayama, both of Japan

[73] Assignee: Noritsu Kenkya Center Co., Ltd., Japan

[21] Appl. No.: 590,142

[22] Filed: Mar. 16, 1984

[30] Foreign Application Priority Data

Mar. 24, 1983 [JP] Japan .................................. 58-47978
Jun. 20, 1983 [JP] Japan ............................... 58-109309

[51] Int. Cl.$^4$ .......................... G01J 3/51; G03B 27/80
[52] U.S. Cl. ..................................... 356/404; 355/38; 364/526
[58] Field of Search .................... 356/404; 355/35, 38; 364/525, 526

[56] References Cited

U.S. PATENT DOCUMENTS 2,949,812 8/1960 Lanco ............................. 356/404 X
3,963,344 6/1976 Hujer et al. ............................ 355/35
4,309,496 1/1982 Miller ............................... 356/404 X

*Primary Examiner*—Vincent P. McGraw
*Attorney, Agent, or Firm*—Larson & Taylor

[57] ABSTRACT

A new method of making it possible to quickly and easily determine the optimum exposure conditions for a photographic color printer is disclosed. The method is performed by way of the steps of preparing a plurality of test prints under different exposure condition using a standard negative film, measuring optical density for each of color components on the test prints, comparing their optical density with that of corresponding color component on a standard print, detecting change in optical density per unit positional change of correction key on each of the test prints with respect to each of color components, and determining corrective value required for correcting density difference between each of test prints and standard print with reference to the above change in optical density per unit positional change of correction key. The color printer includes four lines of exposure correction keys comprising density keys, yellow keys, magenta keys and cyan keys and an exposure condition for test prints is determined such that one of exposure condition correction keys selected from the four lines is a correction key ranked above or below normal keys and all other keys are normal keys.

1 Claim, 3 Drawing Figures

FIG. 2

| | D | Y | M | C |
|---|---|---|---|---|
| 8 | +5 | +5 | +5 | +5 |
| | +4 | +4 | +4 | +4 |
| | +3 | +3 | +3 | +3 |
| | +2 | +2 | +2 | +2 |
| | +1 | +1 | +1 | +1 |
| | N | N | N | N |
| | −1 | −1 | −1 | −1 |
| | −2 | −2 | −2 | −2 |
| | −3 | −3 | −3 | −3 |
| | −4 | −4 | −4 | −4 |
| | −5 | −5 | −5 | −5 |

# METHOD OF DETERMINING THE OPTIMUM EXPOSURE CONDITIONS FOR A COLOR PRINTER

BACKGROUND OF THE INVENTION

1. Field of the Invention

The present invention relates to a method of determining the optimum exposure conditions for a photographic color printer and more particularly to an improved method of making it possible to quickly and easily determine the optimum exposure conditions for a photographic color printer to correct difference in characteristics of processed color prints caused due to difference in characteristics of photographic printing paper and photographic color printer, wherein the method is performed by way of the steps of preparing a plurality of test prints under different exposure condition using a standard negative film by way of exposing, developing and drying of printing paper to be used later in photographic color printer to be used later, measuring optical density for each of color components on the test prints, comparing their optical density with that of corresponding color on a standard print, detecting density difference between each of test prints and standard print and then determining corrective value required for correcting the above density difference.

2. Description of the Prior Art

Color sensibility of color printing papers usually varies in dependence of their manufacturers and moreover it varies appreciably among printing papers manufactured by the same manufacturer. Further, it varies also in dependence on the number of days that elapse since their manufacturing as well as in dependence on how they are stored. On the other hand, characteristics of color printing such as characteristics of exposing inherent to a photographic color printer vary in dependence on the kind of photographic color printer to be used because different light source, filter and others are incorporated in the color printer. In view of these variations as mentioned above remedial actions have been hitherto undertaken in the following manner prior to initiating printing operation on printing paper to be used later by operating a photographic color printer to be used later. Namely, test printing is performed on printing paper to be used later under different exposure condition using a standard negative film, processed test print is visually observed by an operator and test printing and observing are repeated until the optimum exposure conditions (normal exposing values) are reached.

Since the conventional method of determining the optimum exposing conditions has been performed by way of so-called try-and-error steps, a number of labor works are consumed and highly trained skill is required for accomplishing the method.

SUMMARY OF THE INVENTION

Thus, the present invention has been made with the foregoing drawbacks of the conventional method in mind.

It is an object of the present invention to provide a method of determining the optimum exposure conditions for a photographic color printer which makes it possible to assure quick determination without necessity for the conventional try-and-error steps.

It is another object of the present invention to provide a method of determining the optimum exposure conditions for a photographic color printer which makes it possible to assure quantitatively exact determination without occurence of personal error caused by an operator.

It is another object of the present invention to provide a method of determining the optimum exposure conditions for a color printer which makes it possible for any less skilled operator to easily perform the method in accordance with a predetermined procedure.

It is further another object of the present invention to provide a method of determining the optimum exposure conditions for a photographic color printer which makes it possible to assure automatical determination.

To accomplish the above objects there is proposed in accordance with the present invention a method of determining the optimum conditions for a photographic color printer including four lines of exposure condition correction keys comprising density keys, yellow keys, magenta keys and cyan keys, essentially comprising the steps of preparing a plurality of test prints under different exposure conditions using a standard negative film by way of exposing, developing (including fixing) and drying of printing paper, said exposure condition being such that one of exposure condition correction keys selected from the four lines is a correction key ranked above or below normal keys and all other keys are normal keys, measuring optical density for each of color components on the test prints, comparing their optical density with that of corresponding color component on a standard print, detecting change in optical density per unit positional change of correction key on each of the test prints with respect to each of color components, and determining corrective value required for correcting density difference between each of test prints and standard print with reference to said change in optical density per unit positional change of correction key.

Test prints are preferably prepared by printing standard negative film on printing paper under such exposure condition that one of exposure condition correction keys selected from density keys, yellow keys, magenta keys and cyan keys is +1 correction key and all other keys are normal keys or the former is −1 correction key and the latter are normal keys.

To produce different optical densities on test prints a standard negative film is used under different exposure conditions comprising normal-, under- and over-exposure conditions.

Other objects, features and advantages of the invention will be more clearly apparent from reading of the following description which has been prepared in conjunction with the accompanying drawings.

BRIEF DESCRIPTION OF THE DRAWINGS

The accompanying drawings will be briefly described below.

FIG. 2 is a plan view of exposure condition correction keys disposed in the color printer.

DETAILED DESCRIPTION OF THE PREFERRED EMBODIMENT

Now, the present invention will be described in a greater detail hereunder with reference to the accompanying drawings which schematically illustrate a preferred embodiment of the invention.

Figure 1:
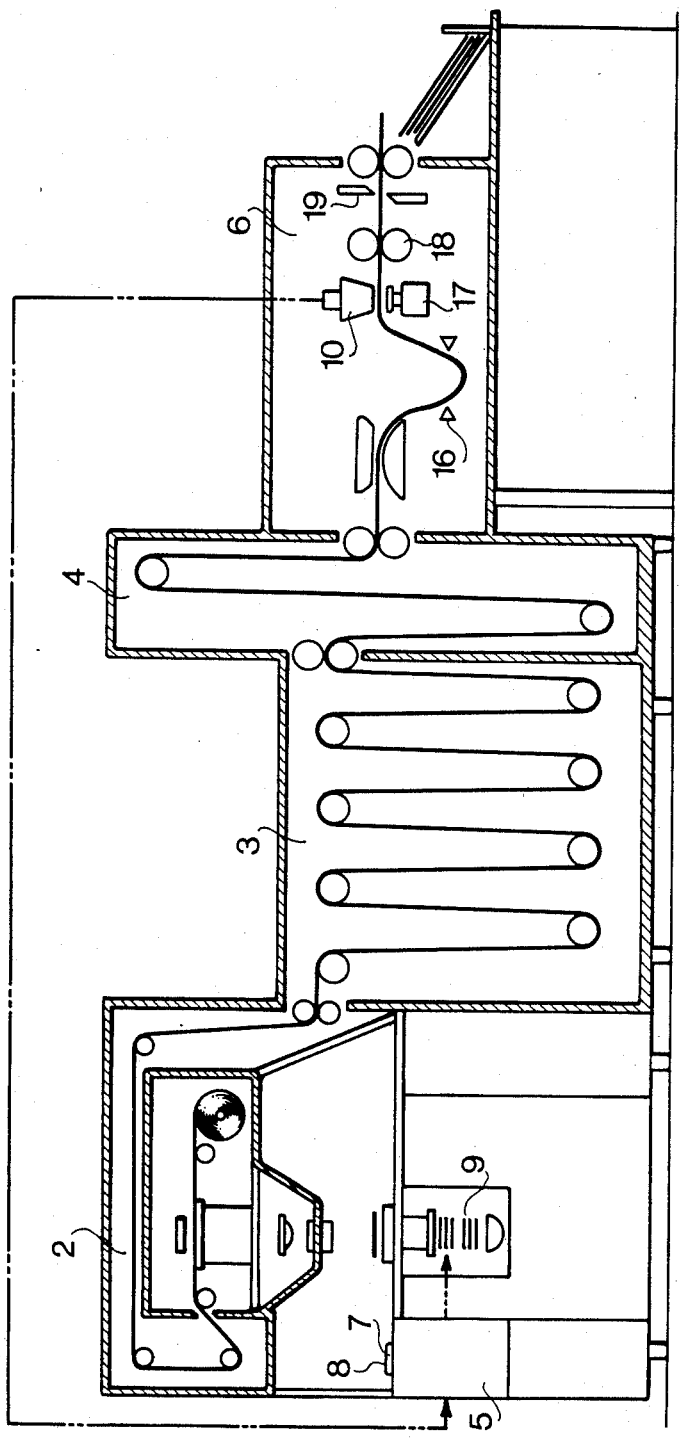
FIG. 1 is a schematic vertical sectional view of a photosensitive material processing apparatus with a photographic color printer incorporated in said apparatus in which a strip of photosensitive material is processed by way of a series of processing sections, wherein an apparatus for performing the method of the invention is also incorporated in the first mentioned apparatus.

Referring first to FIG. 1 which is a schematic vertical sectional view of a photosensitive material processing apparatus to which the method of the invention is applied, reference numeral 1 designates a photosensitive material processing apparatus which includes a combination of a photographic color printer 2, a developing section 3 and a drying section 4 for carrying out for a strip of printing paper a series of processings comprising printing, developing and drying. In addition to them the apparatus includes a control section 5 for controlling and/or determining their operating conditions and an optical density measuring section 6 for measuring optical density for the printing paper, said optical density measuring section 6 being disposed adjacent to the drying section 4.

Next, referring to FIG. 2 reference numeral 8 designates a number of exposure condition correction keys which are arranged in the illustrated order on a control panel 7 in the control section 5 constituting the photosensitive material processing apparatus 1. Specifically, the exposure condition correction keys 8 are composed of four kinds of keys, that is, total density keys D for controlling optical total density, yellow keys Y, magenta keys M and cyan keys C, each of the last-mentioned three keys Y, M and C being adapted to maintain proper color balance. As is apparent from the drawing, the above-mentioned keys are arranged in such an order that −1, −2, −3, −4 and −5 keys are disposed one after another in the leftward direction as seen from the normal key N while +1, +2, +3, +4 and +5 keys are disposed one after another in the rightward direction as seen from the same. Each of the total density keys D and yellow, magenta and cyan keys Y, M and C is intended to control operating time of the color filters 9 in the printer 2 to correct optical density for three colors, that is, yellow, magenta and cyan with reference to processed color prints. Incidentally, minus correction keys comprising −1 to −5 keys are used to determine exposure time shorter than that of the normal key to decrease optical density on processed color print, whereas plus correction keys are used to determine exposure time longer than that of the normal key to increase optical density on processed color print. Each of the three keys Y, M and C is intended to control each of the three color filters 9, while the total density keys D is intended to control the three color filters 9.

Prior to starting operation of the photosensitive material processing apparatus 1, a strip of printing paper to be used and a standard negative film for setup are fitted into the color printer 2 and test printing is repeatedly performed at nine times while the correction keys are arranged as illustrated on Table 1. Exposed printing paper is developed in the developing section 3 and it is then dried in the drying section 4 so that nine test prints comprising No. 1 to 9 test prints are obtained.

TABLE 1

| test No. | D Key | Y Key | M Key | C Key |
| --- | --- | --- | --- | --- |
| 1 | N | N | N | N |
| 2 | N | +1 | N | N |
| 3 | N | −1 | N | N |
| 4 | N | N | +1 | N |
| 5 | N | N | −1 | N |
| 6 | N | N | N | +1 |
| 7 | N | N | N | −1 |
| 8 | +1 | N | N | N |
| 9 | −1 | N | N | N |

In the above table No. 1 referes to the case where normal keys are used for all of four kinds of correction keys, that is, density key, yellow key, magenta key and cyan key, and Nos. 2 to 9 refer to the case where any one among them is replaced with +1 or −1 correction key and the other ones are kept unchanged. It should be noted that the arrangement of correction keys for No. 1 is merely illustrative for easy understanding of the invention and therefore it is not used hereinafter but it may be used in some case.

Next, Nos. 2 to 9 test prints are measured for their optical density with respect to each of color components using an optical density meter 10 in the density measuring section 6 in order to compare it with that of each of color components on a standard print. Incidentally, the standard print refers to a highest quality print which is preliminarily produced using the standard negative film.

Figure 3:
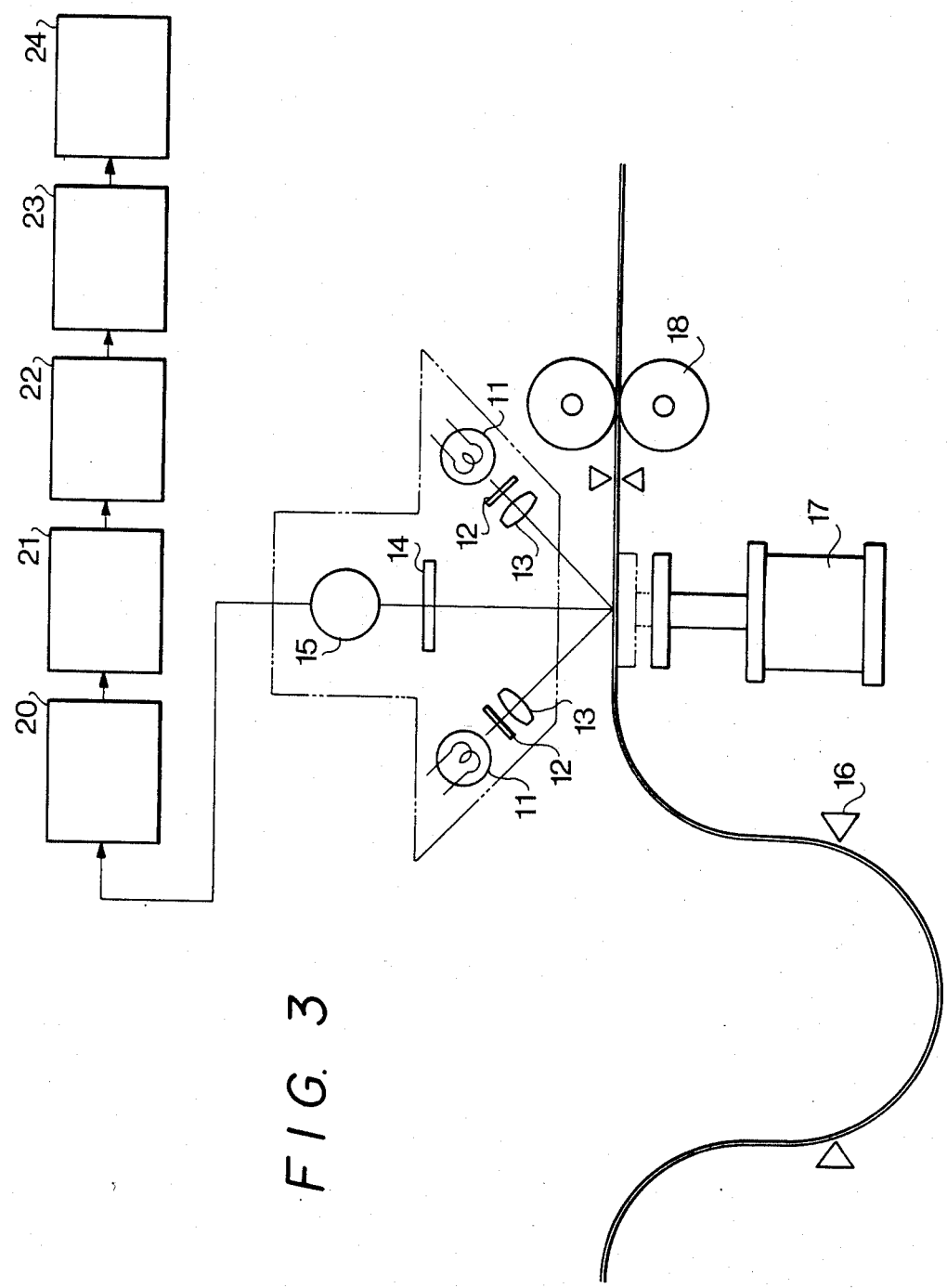
FIG. 3 is a schematic side view of an apparatus for measuring and calculating optical density on test prints.

Various means are employable for the purpose of comparing test print with standard print. For example, comparison is made on measuring of the optical density by way of the steps of presetting color density of the standard print to zero on the density meter and then measuring color density of the test print by means of the density meter whereby density deviation of the latter from the former (for instance, +0.1, −0.1) can be obtained. Usually, an optical density meter of the type as illustrated in FIG. 3 is employed which comprises light source lamps 11 (tungsten lamp, halogen lamp or the like), heat absorptive filters 12, lenses 13, a filter 14 colored with red, green or blue and a photoelectric element 15 (photoelectric tube, photoelectric amplifying tube, photoelectric cell or the like) adapted to measure optical density of light which is reflected from the color print at an angle of 45 degrees relative to the passage of incoming light emitted from the light source lamps 11 toward the color print at an angle of 45 or 90 degrees via the heat absorptive filters 12 and the lens 13. The measurement is made by the photoelectric element 15 via the filter 14. However, the present invention should not be limited only to the above-described type but a density meter of the type may be acceptable which is designed to measure optical density of light which has been transmitted through color print (transmittance). At any rate it is necessary that any value on the density meter is indicated in the form of a logarithmic value of optical intensity of reflected light or transmitted light so as to represent a proportional relation with respect to color density. To measure yellow, magenta and cyan densities on the color print, filters (colored with blue, green and red) corresponding to their complementary colors should be used. The results obtained from measurements of yellow, magenta and cyan densities made for Nos. 2 to 9 test prints are shown on Table 2.

TABLE 2

| test No. | density deviation from standard print | | |
|---|---|---|---|
| | yellow | magenta | cyan |
| 2 | $Y_{+1Y}$ | $M_{+1Y}$ | $C_{+1Y}$ |
| 3 | $Y_{-1Y}$ | $M_{-1Y}$ | $C_{-1Y}$ |
| 4 | $Y_{+1M}$ | $M_{+1M}$ | $C_{+1M}$ |
| 5 | $C_{-1M}$ | $M_{-1M}$ | $X_{-1M}$ |
| 6 | $Y_{+1C}$ | $M_{+1C}$ | $C_{+1C}$ |
| 7 | $C_{-1C}$ | $M_{-1C}$ | $X_{-1C}$ |
| 8 | $Y_{+1D}$ | $M_{+1D}$ | $C_{+1D}$ |
| 9 | $Y_{-1D}$ | $M_{-1D}$ | $C_{-1D}$ |

Basically, density deviation of test print from standard print can be obtained by making measurements with both the standard print and test print (No. 1) and comparing the latter with the former but anything is not know only from the above-described density deviation as to how density keys, yellow keys, magenta keys and cyan keys should be corrected. This is attributable to the fact that all of yellow, magenta and cyan densities on processed color print change when any one among correction keys is changed. Accordingly, this forms one of reasons why highly trained skill is required for correction of density deviation (another reason is such that quantitative determination is visually made only with much difficulties for the same purpose).

Further, referring to FIG. 3, reference numeral 16 designates a detecting sensor for detecting a strip of printing paper which is displaced forwardly by means of a pair of driving rollers 18, reference numeral 17 does a solenoid adapted to be raised up to immovably hold travelling printing paper and reference numeral 19 does a cutter. After completion of a series of processings in that way processed color prints are automatically measured for their optical density one after another without any failure in the order of measurements, using the optical density meter 10. As schematically illustrated in FIG. 3, electrical signal transmitted from the photoelectrical element 15 is introduced into a computor 23 via an analog signal lamp 20, an A/D converter 21 and an input section 22.

In general, change in each of color densities on a processed color print caused by positional changing of correction keys such as density key and others can be expressed by the following simple equations within the limited extent of change, wherein reference letter A designates density coefficient (change in density of color print per unit positional change (unit width) of correction key), reference letter X does positional change of key (width of key) and reference letter K does a constant.

1. change in yellow density caused due to positional changing $X_D$ of density keys:

$$Y_D = A_{YD} \cdot X_D + K_{YD} \quad (1)$$

change in magenta density caused due to positional changing $X_D$ of density keys:

$$M_D = A_{MD} \cdot X_D + K_{MD} \quad (2)$$

change in cyan density caused due to positional changing $X_D$ of density keys:

$$C_D = A_{CD} \cdot X_D + K_{CD} \quad (3)$$

2. change in yellow density caused due to positional changing $X_Y$ of yellow keys:

$$Y_Y = A_{YY} \cdot X_Y + K_{YY} \quad (4)$$

change in magenta density caused due to positional changing $X_Y$ of yellow keys:

$$M_Y = A_{MY} \cdot X_Y + K_{MY} \quad (5)$$

change in cyan density caused due to positional changing $X_Y$ of yellow keys:

$$C_Y = A_{CY} \cdot X_Y + K_{CY} \quad (6)$$

3. change in yellow density caused due to positional changing $X_M$ of magenta keys:

$$Y_M = A_{YM} \cdot X_M + K_{YM} \quad (7)$$

change in magenta density caused due to positional changing $X_M$ of magenta keys:

$$M_M = A_{MM} \cdot X_M + K_{MM} \quad (8)$$

changing in cyan density caused due to positional changing $X_M$ of magenta keys:

$$C_M = A_{CM} \cdot X_M + K_{CM} \quad (9)$$

4. change in yellow density caused due to positional changing $X_C$ of cyan keys:

$$Y_C = A_{YC} \cdot X_C + K_{YC} \quad (10)$$

change in magenta density caused due to positional changing $X_C$ of cyan keys:

$$M_C = A_{MC} \cdot X_C + K_{MC} \quad (11)$$

change in cyan density caused due to positional changing $X_C$ of cyan keys:

$$C_C = A_{CC} \cdot X_C + K_{CC} \quad (12)$$

Now, total change in yellow density caused due to positional changing of all keys comprising density keys and others (density deviation) Y can be expressed using the following equation.

$$Y = Y_D + Y_Y + Y_M + Y_C$$

Further, by introducing equations (1), (4), (7) and (10) into the above one the latter can be expressed in the modified form as illustrated by the following equation.

$$Y = A_{YD} \cdot X_D + A_{YY} \cdot X_Y + A_{YM} \cdot X_M + \quad (13)$$
$$A_{YC} \cdot X_C + K_{YD} + K_{YY} + K_{YM} + K_{YC}$$

Next, total change in magenta density caused due to positional changing of all keys comporising density keys and others (density deviation) M can be expressed in the same manner using the following equation.

$$M = M_D + M_Y + M_M + M_C$$

Further, by introducing equations (2), (5), (8) and (11) into the above one the latter can be expressed in the modified form as illustrated by the following equation.

$$M = A_{MD} \cdot X_D + A_{MY} \cdot X_Y + A_{MM} \cdot X_M + A_{MC} \cdot X_C + \quad (14)$$
$$K_{MD} + K_{MY} + K_{MM} + K_{MC}$$

Next, total change in cyan density caused due to positional changing of all keys comprising density keys and others (density deviation) C can be expressed in the same manner using the following equation.

$$C = C_D + C_Y + C_M + C_C$$

Further, by introducing equations (3), (6), (9) and (12) into the above one the latter can be expressed in the modified form as illustrated by the following equation.

$$C = A_{CD} \cdot X_D + A_{CY} \cdot X_Y + A_{CM} \cdot X_M + A_{CC} \cdot X_C + \quad (15)$$
$$K_{CD} + K_{CY} + K_{CM} + K_{CC}$$

To look for A and K in equations (13), (14) and (15) the values shown on Table 2 are introduced into these equations. First, refering to equation (13), yellow density deviation $Y_{+1D}$ due to positional changing of just +1D key (+1 density key) from normal can be expressed using the following equation, since $$Y = Y_{+1D}, X_D = +1, X_Y = 0, X_M = 0 \text{ and } X_C = 0. \quad (16)$$

$$Y_{+1D} = A_{YD} \cdot (+1) + K_{YD} + K_{YY} + K_{YM} + K_{YC}$$

Next, yellow density deviation $Y_{-1D}$ due to positional changing of $-1D$ key from normal can be expressed in the same manner using the following equation.

$$Y_{-1D} = A_{YD} \cdot (-1) + K_{YD} + K_{YY} + K_{YM} + K_{YC} \quad (17)$$

Further, the following two equations are obtainable from equations (16) and (17).

$$A_{YD} = \tfrac{1}{2}(Y_{+1D} - Y_{-1D}) \quad (18)$$

$$K_{YD} + K_{YY} + K_{YM} K_{YC} = \tfrac{1}{2}(Y_{+1D} + Y_{-1D}) \quad (19)$$

Further, the following two equations are obtainable by introducing the values of $Y_{+1Y}$ and $Y_{-1Y}$ into equation (13) in the same manner.

$$A_{YY} = \tfrac{1}{2}(Y_{+1Y} - Y_{-1Y}) \quad (20)$$

$$K_{YD} + K_{YY} + K_{YM} + K_{YC} = \tfrac{1}{2}(Y_{+1Y} + Y_{-1Y}) \quad (21)$$

Further, the following two equations are obtainable by introducing the values of $Y_{+1M}$ and $Y_{-1M}$ into equation (13) in the same manner.

$$A_{YM} = \tfrac{1}{2}(Y_{+1M} - Y_{-1M}) \quad (22)$$

$$K_{YD} + K_{YY} + K_{YM} + K_{YC} = \tfrac{1}{2}(Y_{+1M} + Y_{-1M}) \quad (23)$$

Further, the following two equations are obtainable by introducing the values of $Y_{+1C}$ and $Y_{-1C}$ into equation (13) in the same manner.

$$A_{YC} = \tfrac{1}{2}(Y_{+1C} - Y_{-1C}) \quad (24)$$

$$K_{YD} + K_{YY} + K_{YM} + K_{YC} = \tfrac{1}{2}(Y_{+1C} + Y_{-1C}) \quad (25)$$

As a result the following equation can be obtained from equations (19), (21), (23) and (25).

$$K_{YD} + K_{YY} + K_{YM} + K_{YC} = \tfrac{1}{8}(Y_{+1D} + Y_{-1D} + Y_{+1Y} + Y_{-1Y} + Y_{+1M} + Y_{-1M} + Y_{+1C} + Y_{-1C}) \quad (26)$$

This equation is used hereinafter, but equations (19), (21), (23) and (25) can be used.

Following density coefficients and konstants are obtainable from equations (14) and (15) in the same manner as in case of equation (13).

$$A_{MD}, A_{MY}, A_{MM}, A_{MC},$$
$$K_{MD} + K_{MY} + K_{MM} + K_{MC}, A_{CD}, A_{CY}, A_{CM},$$
$$A_{CC}, K_{CD} + K_{CY} + K_{CM} + K_{CC}$$

By introducing the values of the density coefficients and konstants into equations (13), (14) and (15) the following modified equations can be obtained.

$$Y = \tfrac{1}{2}(Y_{+1D} - Y_{-1D})X_D + \tfrac{1}{2}(Y_{+1Y} - Y_{-1Y})X_Y + \quad (27)$$
$$\tfrac{1}{2}(Y_{+1M} - Y_{-1M})X_M + \tfrac{1}{2}(Y_{+1C} - Y_{-1C})X_C + \tfrac{1}{8}(Y_{+1D} +$$
$$Y_{-1D} + Y_{+1Y} + Y_{-1Y} + Y_{+1M} + Y_{-1M} + Y_{+1C} + Y_{-1C})$$

$$M = \tfrac{1}{2}(M_{+1D} - M_{-1D})X_D + \tfrac{1}{2}(M_{+1Y} - M_{-1Y})X_Y + \quad (28)$$
$$\tfrac{1}{2}(M_{+1M} - M_{1M})X_M + \tfrac{1}{2}(M_{+1C} - M_{-1C})X_C + \tfrac{1}{8}(M_{+1D} +$$
$$M_{-1D} + M_{+1Y} + M_{-1Y} + M_{+1M} + M_{-1M} + M_{+1C} + M_{-1C})$$

$$C = \tfrac{1}{2}(C_{+1D} - C_{-1D})X_D + \tfrac{1}{2}(C_{+1Y} - C_{-1Y})X_Y + \quad (29)$$
$$\tfrac{1}{2}(C_{+1M} - C_{-1M})X_M + \tfrac{1}{2}(C_{+1C} - C_{-1C})X_C + \tfrac{1}{8}(C_{+1D} +$$
$$C_{-1D} + C_{+1Y} + C_{-1Y} + C_{+1M} + C_{-1M} + C_{+1C} + C_{-1C})$$

Now, correction values for allowing color densities on processed color print to be equalized to those on standard print are expressed in the form of $X_D$, $X_Y$, $X_M$ and $X_C$ by replacing Y, M and C on the left terms in equations (27), (28) and (29) with zero. It should be noted that there are existent an infinite number of resolutions with respect to $X_D$, $X_Y$, $X_M$ and $X_C$, because three equations are provided for looking for $X_D$, $X_Y$, $X_M$ and $X_C$. In view of equalizing exposure time for each color the optimum values of $X_D$, $X_Y$, $X_M$ and $X_C$ can be obtained by using the following four equations with an experimental equation $(X_Y + X_M + X_C = 0)$ added thereto, said experimental equation being intended to minimize the values of $X_Y$, $X_M$ and $X_C$.

$$0 = \tfrac{1}{2}(Y_{+1D} - Y_{-1D})X_D + \tfrac{1}{2}(Y_{+1Y} - Y_{-1Y})X_Y + \quad (30)$$
$$\tfrac{1}{2}(Y_{+1M} - Y_{-1M})X_M + \tfrac{1}{2}(Y_{+1C} - Y_{-1C})Y_C + \tfrac{1}{8}(Y_{+1D} +$$
$$Y_{-1D} + Y_{+1Y} + Y_{-1Y} + Y_{+1M} + Y_{-1M} + Y_{+1C} + Y_{-1C})$$

$$0 = \tfrac{1}{2}(M_{+1D} - M_{-1D})X_D + \tfrac{1}{2}(M_{+1Y} - M_{-1Y})X_Y + \quad (31)$$
$$\tfrac{1}{2}(M_{+1M} - M_{-1M})X_M + \tfrac{1}{2}(M_{+1C} - M_{-1C})X_C + \tfrac{1}{8}(M_{+1D} +$$
$$M_{-1D} + M_{+1Y} + M_{-1Y} + M_{+1M} + M_{-1M} + M_{+1C} + M_{-1C})$$

$$0 = \tfrac{1}{2}(C_{+1C} - C_{-1C})X_D + \tfrac{1}{2}(C_{+1Y} - C_{-1Y})X_Y + \quad (32)$$
$$\tfrac{1}{2}(C_{+1M} - C_{-1M})X_M + \tfrac{1}{2}(C_{+1C} - C_{-1C})X_C + \tfrac{1}{8}(C_{+1D} +$$
$$C_{-1D} + C_{+1Y} + C_{-1Y} + C_{+1M} + C_{-1M} + C_{+1C} + C_{-1C})$$

$$X_Y + X_M + X_C = 0 \quad (33)$$

Thus, correction values for allowing color densities on processed color print to be equalized to those on standard print can be obtained in the form of $X_D$, $X_Y$, $X_M$ and $X_C$ for example, by way of the steps of storing the equations (30), (31), (32) and (33) in the storing section of the computor 23, inputting the data relative to test prints shown on Table 2 and then processing them with the aid of the computor. Next, electrical signals of the correction values coming from the computer are transmitted to the actuating section for the color filter (cut filter) 9 via an output section 24 whereby adequate correction for optimum exposure conditions is automatically achieved.

The present invention has been described above with respect to the case where the optimum exposure conditions (normal exposure values) are looked for with a single standard negative film used for setup. However, it should of cource be understood that the present invention should not be limited only to this but the optimum values of $X_D$, $X_Y$, $X_M$ and $X_C$ may be obtained in the above-described manner by using standard negative films which are preliminarily prepared under different predetermined exposure conditions including normal-exposure, under-exposure and over-exposure. Changes in values of $X_D$, $X_Y$, $X_M$ and $X_C$ caused due to changing of the exposure conditions of standard negative films (for instance, changes in density) can be known quantitatively by preliminary measurement, since they can be expressed by simple equation within the limited measurement extent between normal-exposure and over-exposure or between normal-exposure and under-exposure. Therefore it is possible to obtain the optimum values of $X_D$, $X_Y$, $X_M$ and $X_C$ for the negative film to be used by measuring density or the like to know the exposure condition of the negative film to be used.

In the embodiment as illustrated in FIG. 1 a photographic color printer is incorporated in a complete set of photographic processing apparatus but the present invention should not be limited only to this. Alternatively, a photographic color printer may be disposed separate from the photographic processing apparatus. Further, printing paper in the form of sheet may be used instead of a strip of printing paper.

Further, the present invention should not be limited to mechanical and continuous performance of measurements of optical density on processed color print but they may be performed one by one by an operator. Processing of data may be performed with the aid of any processor or calculator other than computer and moreover correction values derived from processing operations may be provided for the purpose of allowing an operator to manually correct exposing conditions.

While the present invention has been described above with respect to a preferred embodiment thereof, it should of cource be understood that it should not be limited only to this but various changes or modifications may be made in any suitable manner without departure from the spirit and scope of the invention.

What is claimed is:

1. A method of determining the optimum exposure time condition for a photographic color printer including four lines of correction keys comprising density keys, yellow keys, magenta keys and cyan keys which have a series of keys differing by one unit corresponding to different exposure time, essentially comprising the following steps;

preparing 8 test prints under different exposure time condition using a standard negative film by way of exposing, developing and drying of printing paper, said exposure time condition being such that one of correction keys selected from the four lines is $+1$ correction key or $-1$ correction key and remaining keys are normal keys, measuring optical density for each of color components Y.M.C. on the test prints, comparing their optical density with that of corresponding color component on a standard print to obtain $Y_{+1D}$, $Y_{-1D}$, $Y_{+1Y}$, $Y_{-1Y}$, $Y_{+1M}$, $Y_{-1M}$, $Y_{+1C}$,
$Y_{-1C}$, $M_{+1D}$, $M_{-1D}$, $M_{+1Y}$, $M_{-1Y}$, $M_{+1M}$,
$M_{-1M}$, $M_{+1C}$, $M_{-1C}$, $C_{+1D}$, $C_{-1D}$, $C_{+1Y}$,
$C_{-1Y}$, $C_{+1M}$, $C_{-1M}$, $C_{+1C}$, $C_{-1C}$, determining corrective values $X_D$, $X_Y$, $X_M$, $X_C$ required for correcting density differences between test print prepared by using all normal keys with respect to density key, yellow key, magenta key and cyan key and standard print by satisfying the following equations:

$$0 = \tfrac{1}{2}(Y_{+1D} - Y_{-1D})X_D + \tfrac{1}{2}(Y_{+1Y} - Y_{-1Y})X_Y +$$
$$\tfrac{1}{2}(Y_{+1M} - Y_{-1M})X_M + \tfrac{1}{2}(Y_{+1C} - Y_{-1C})X_C +$$
$$\tfrac{1}{2}(Y_{+1D} + Y_{-1D} + Y_{+1Y} + Y_{-1Y} + Y_{+1M} + Y_{-1M} +$$
$$Y_{+1C} + Y_{-1C})$$

$$0 = \tfrac{1}{2}(M_{+1D} - M_{-1D})X_D + \tfrac{1}{2}(M_{+1Y} - M_{-1Y})X_Y +$$
$$\tfrac{1}{2}(M_{+1M} - M_{-1M})X_M + \tfrac{1}{2}(M_{+1C} - M_{-1C})X_C +$$
$$\tfrac{1}{2}(M_{+1D} + M_{-1D} + M_{+1Y} + M_{-1Y} + M_{+1M} + M_{-1M} +$$
$$M_{+1C} + M_{-1C})$$

$$0 = \tfrac{1}{2}(C_{+1C} - C_{-1C})X_D + \tfrac{1}{2}(C_{+1Y} - C_{-1Y})X_Y +$$
$$\tfrac{1}{2}(C_{+1M} - C_{-1M})X_M + \tfrac{1}{2}(C_{+1C} - C_{-1C})X_C +$$
$$\tfrac{1}{2}(C_{+1D} + C_{-1D}) + C_{+1Y} + C_{-1Y} + C_{+1M} + C_{-1M} +$$
$$C_{+1C} + C_{-1C})$$

$$X_Y + X_M + X_C = 0.$$

* * * * *

UNITED STATES PATENT AND TRADEMARK OFFICE
CERTIFICATE OF CORRECTION

PATENT NO. : 4,611,918

DATED : September 16, 1986

INVENTOR(S) : Nishida and Ikeura

It is certified that error appears in the above—identified patent and that said Letters Patent is hereby corrected as shown below:

On the cover page, at entry "[73] Assignee", change Kenkya" to --Kenkyu--.

Signed and Sealed this

Tenth Day of March, 1987

Attest:

DONALD J. QUIGG

*Attesting Officer*      *Commissioner of Patents and Trademarks*